C. HULTGREN.
DRYING ROOM.
APPLICATION FILED OCT. 21, 1912.

1,110,788.

Patented Sept. 15, 1914.
2 SHEETS—SHEET 1.

Witnesses
Martin H. Olsen
Edwin Phelps

Inventor
Charles Hultgren
By Rummler & Rummler
Attys

C. HULTGREN.
DRYING ROOM.
APPLICATION FILED OCT. 21, 1912.

1,110,788.

Patented Sept. 15, 1914.
2 SHEETS—SHEET 2.

UNITED STATES PATENT OFFICE.

CHARLES HULTGREN, OF CHICAGO, ILLINOIS, ASSIGNOR, BY MESNE ASSIGNMENTS, TO WENBORNE-KARPEN DRYER CO., A CORPORATION OF WEST VIRGINIA.

DRYING-ROOM.

1,110,788.     Specification of Letters Patent.     Patented Sept. 15, 1914.

Application filed October 21, 1912. Serial No. 727,002.

*To all whom it may concern:*

Be it known that I, CHARLES HULTGREN, a citizen of the United States of America, and a resident of Chicago, county of Cook, and State of Illinois, have invented certain new and useful Improvements in Drying-Rooms, of which the following is a specification.

The main objects of this invention are to provide an improved construction for drying kilns or rooms, and particularly those which are intended to be used for the drying of coatings of varnish and kindred substances; to provide an improved construction for such drying rooms whereby, at the will of the operator, the air may be repeatedly recirculated or the fume laden air may be discharged and replaced with fresh air either continuously or at intervals; to provide an improved construction and arrangement of the air passages, whereby heat, which might otherwise be lost through the walls of the heating chamber, may be utilized to increase the operating efficiency; to provide improved means for insuring a substantially uniform distribution of the air movement throughout the interior of the drying chamber; and to provide certain improvements in the arrangement and connections of the operating parts of the device whereby the control of the temperature of the drying room may be to a large extent automatic.

Figure 1:
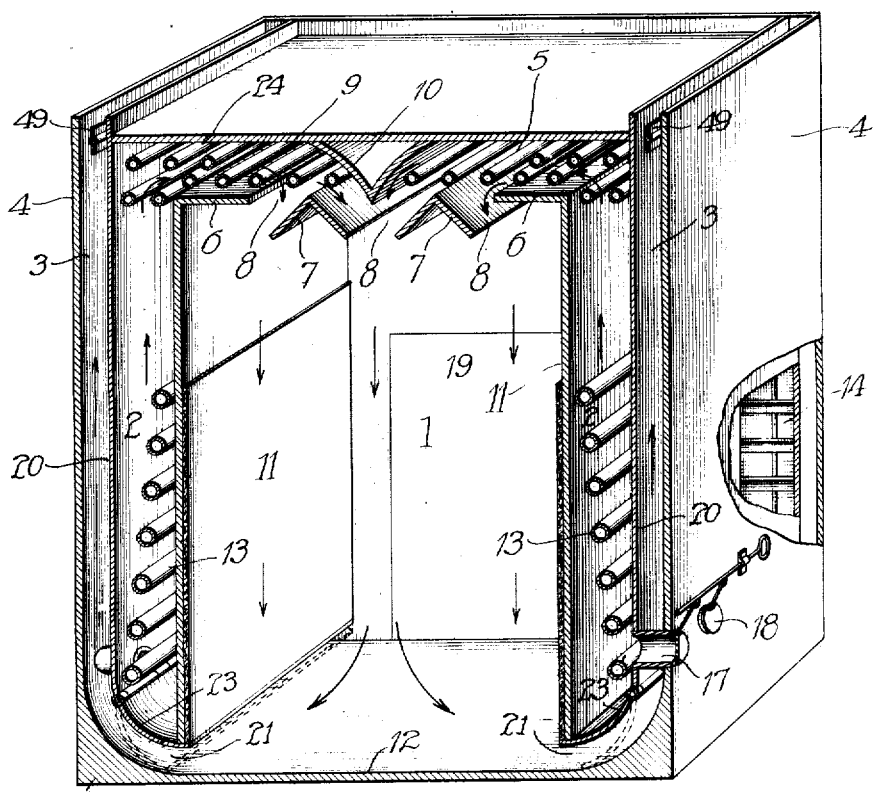
Figure 2:
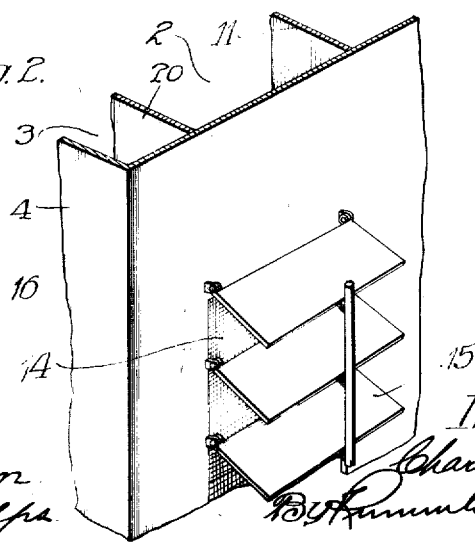
Figure 3:
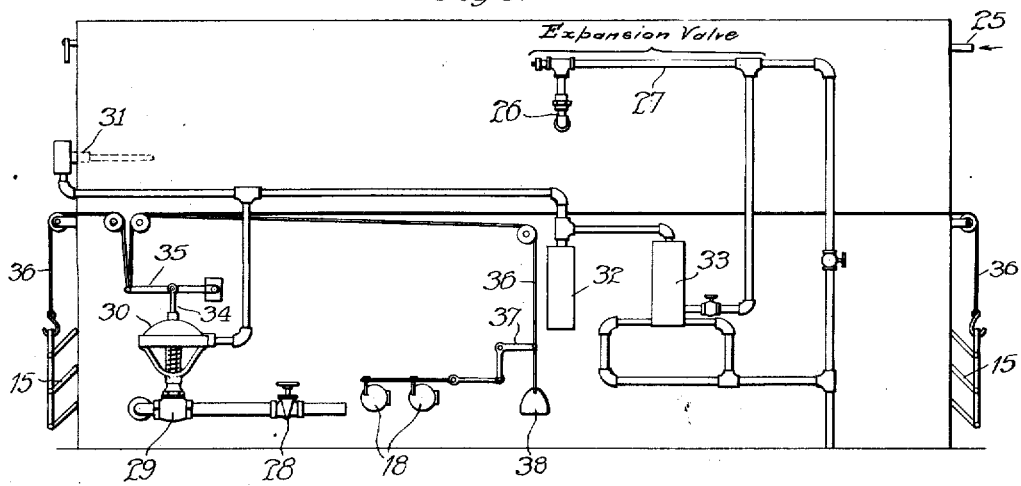
Figure 4:
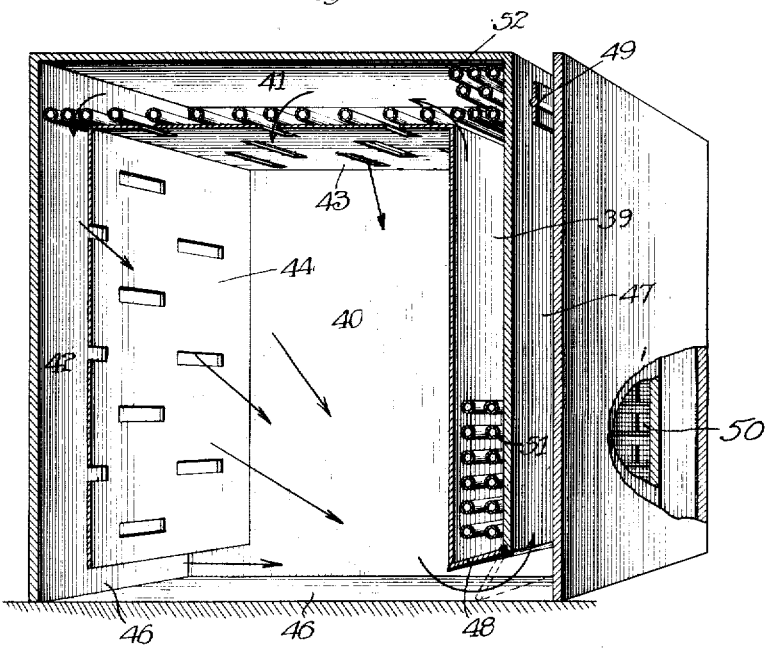

A structural embodiment of this invention, as applied to drying rooms intended for drying coatings of varnish, &c., is illustrated in the accompanying drawings, in which:

Figure 1 is a perspective view partly sectional. Fig. 2 is a detail of the regulators for controlling the admission of air at the air inlets. Fig. 3 is a diagram showing a suitable arrangement of operating apparatus for automatically controlling the supply of heating medium to the heating coils, of cooling medium to the cooling coils, and of fresh air to their inlets. Fig. 4 is a perspective view partly sectional of a similar drying room having a modified arrangement of the air passages.

In the form shown in Figs. 1 to 3 of the drawings, the apparatus comprises a plurality of walls and partitions so arranged as to provide a main compartment or drying chamber 1, heating chambers in the form of updraft air inlet flues 2 located at opposite longitudinal sides of the drying chamber and coextensive therewith, and updraft outlet flues 3 located between the inlet flues 2 and the outer walls 4 of the apparatus and being also coextensive in length with the drying chamber.

The drying chamber is provided with an air distributing space or chamber 5 in the form of a cross-draft flue extending between the open upper ends of the updraft inlet flues 2 and communicating with both. This distributing chamber is preferably separated from the drying chamber 1 by means of a false ceiling having distributed openings therein. In the form shown, the false ceiling is made up of level portions 6 and a plurality of inverted V-shaped deflector members 7 spaced apart from each other and from the lever portions 6 to provide the distributed inlet openings 8 between them. Depending from the main ceiling 9 between the members 7 is a V-shaped partition or deflector member 10. It will be seen that these deflector members are so arranged with respect to the openings 8, as to cause the air current to divide into a plurality of streams and spread out over the entire width of the drying chamber. The inner side walls 11 of the drying chamber also serve as side walls for the updraft flues 2, and are connected at the top with the false ceiling portions 6, while at the bottom they are spaced above the floor 12 to provide an air outlet at each side of the drying room extending throughout its entire length and communicating with the lower parts of the updraft outlet flues 3. If desired, the lower parts of the outlet flues 3 may be curved, as shown, to avoid eddy currents and consequent resistance to the flow of air at this point.

Heating means, usually in the form of steam coils 13, are suitably arranged within the updraft inlet flues to heat the air prior to its entering the drying chamber. The updraft inlet flues have inlet openings 14 at their opposite ends, adjacent to the floor to admit fresh air from the outside, and these openings are controlled by suitable closures 15. In the form shown these closures consist of a series of shutters pivotally mounted at opposite sides of the openings 14 and provided with suitable mechanism, to be hereinafter described, for opening and closing them for regulating the air flow.

If the drying room is of great length, it may be desirable to provide additional air inlets between its ends, as indicated at 17, and these may be provided with hinged closures 18 operated in a manner similar to the closures 15. The inlets 17 may be in the form of tubes extending across the updraft outlet flues 3, and should be shaped so as to offer as little obstruction as possible to the free flow of air in the flues 3.

Entrance and egress to and from the drying chamber is had by suitable doors in the ends thereof, one of which may be seen at 19 at the back of the drying chamber.

The partitions 20, which separate the inlet flues from the outlet flues, may be made of comparatively thin sheet metal plates, in the present type of drying room, because the heat transferred through them is not lost but increases the temperature of the air in the outlet flues and accordingly increases the velocity of the air flow.

If the drying room is to be used for drying coatings of varnish, paint, &c., the air before being admitted to the drying chamber should be free from dust and solid particles held in suspension, and it should, therefore, be passed through a filtering medium (not shown) and which in character will, of course, depend upon the source of the inflowing air. If this source is fairly pure, a thin fabric such as cheese cloth stretched over the inlet openings 14 will serve this purpose.

The higher grades of varnish dry or solidify mainly as the result of oxidation of the linseed oil and gum, whereas lower grades of varnish usually contain driers and volatile ingredients, and dry as the result of evaporation of these ingredients. The admission of fresh air, and the discharge of the foul air, is especially important during those stages of the drying operation, in which the volatile ingredients pass off from the varnish, but after these volatile ingredients have been carried off by the air a single charge of fresh air will contain ample oxygen for oxidizing and solidifying the remaining ingredients. It is, therefore, desirable, from the standpoint of economy, to provide means whereby the air may be continuously recirculated through the drying chamber without carrying off heat to the atmosphere. To this end the bottom wall of each of the updraft inlet flues is made in the form of a damper 23, which is movable between the position where it will close the bottom of the flue 2, as shown by full lines in Fig. 1, and the position in which it is shown by dotted lines where it opens the bottom of the flue 2 and closes the bottom of the outlet flue 3.

A system of condensing coils 24 is arranged in the distributing compartment 5, above the drying room, and serves the double function of tempering the air before it is admitted to the drying room, and of cooling the air so that the air in the drying room will be denser than the hotter air is in the updraft flues 2 and, therefore, insuring a continuous circulation of the air when the dampers 23 are down. At such times the inlets 14 should also be closed.

The inlets may be controlled either by hand or automatically, and in dry rooms, which are provided with thermostats for controlling the heat, the air inlets may be connected to the valve operating motor so that when the steam is cut off from the heating coils the air inlets may be opened wider and thereby admit a greater quantity of cool air and assist in bringing the drying chamber to the predetermined normal drying temperature. An arrangement of this kind is illustrated in Fig. 3, the relative proportions of the parts being to some extent exaggerated for the sake of clearness.

In the form shown, the condensers or cooling coils 24 have their inlet 25 connected to a source of cooling medium, such as water, and their outlet end 26 is controlled by a suitable expansion valve 27, adjusted to normally shut off the flow of water or cooling medium at the outlet 26 until the temperature thereof reaches a certain predetermined degree, at which time the expansion of the expansible element in the valve opens the same and starts the flow of cooling medium. The admission of steam or heating medium to the heating coils 13 is controlled by a gate valve 28, and in addition thereto by a valve 29 operated by a suitable motor 30 which, in the form shown, comprises a diaphragm movable by pneumatic pressure and controlled by a thermostat 31. The air pressure is obtained from a reservoir 32 fed by an air pump 33, which is shown connected to the water pipe leading from the condenser system so as to be operated by the water flowing out of the condensers. The expansion valve 27, the thermostat 31, the diaphragm valve 29, and the air pump 33 are already known, for the purpose of controlling the flow of heat and cooling mediums in the heating coils and cooling coils of drying rooms, and as their specific construction does not form a part of the present invention they will not be herein described in detail.

In the form shown, the motor 30 has a rod 34, extending from the diaphragm upwardly through the top of the casing. This is connected by a link to a lever 35, which in turn is connected by cables or chains 36 to the inlet closures 15 and 18, in the latter case a bell-crank 37 being introduced in the connection and being connected to a weight 38 which normally closes the closures 18.

In the modified form shown in Fig. 4, the kiln is provided with a single updraft inlet flue 39 at one side of the drying chamber 40, and there is a cross-draft flue 41 which connects the updraft inlet flue with a down-draft flue 42. The false ceiling 43 and the inner wall 44 of the down-draft flue are foraminous, being provided with distributed restricted inlet openings of such area and arrangement that the air entering the drying chamber 40 will be caused to first spread out in the cross-draft and down-draft flues, so as to secure a substantially uniformly distributed air current throughout the entire volume of the room. The wall 44 is spaced above the floor 45 of the drying chamber to provide a narrow inlet 46 which insures a draft across the floor for the purpose of drying articles close to the floor, such as the feet of articles of furniture. This structure is also provided with an updraft outlet flue 47, and the bottom of the updraft inlet flue is fitted with a damper or valve 48, as in the device shown in Fig. 1, whereby the air leaving the drying chamber may be directed either into the heating chamber or inlet flue 39, or into the outlet flue 47. A damper 49, at the top of the outlet flue 47, is also provided in order to close said outlet flue for the purpose of conserving the heat when said flue is not in use for carrying off vitiated air from the drying room. This kiln is also provided with air inlets 50, heating coils 51, and cooling coils 52, arranged somewhat similarly to the respective features of the kiln illustrated in Fig. 1. The arrangement of the heating coils, cooling coils, and foraminous walls, illustrated in Fig. 4, is not broadly claimed in the present application, but is more fully described and claimed in my co-pending application, Serial No. 657,648, filed October 30, 1911, for kilns.

The operation of the device shown in Figs. 1, 2, and 3 is as follows: In drying coatings of varnishes of the lower grades, that is those which contain a large proportion of volatile ingredients, the dampers 23 and 49 are turned to the positions in which they are shown by full lines in Fig. 1, and steam is admitted to the heating coils by opening the gate valve 28. The thermostat 31 and the expansion valve 27 having been previously set for the desired temperatures, the kiln may be closed up and allowed to take care of itself. The air flows in at the inlets 14, becomes heated by the heating coils 13, and rises in the updraft flues 2 to the cross-draft flue 5 where it spreads out across the top of the drying room and is directed by the inlets 8 and the deflectors 7 and 10 into the drying chamber, where it flows downwardly toward the outlet openings 21 and then upwardly through the outlet flues 3. The lighter columns of air in the updraft inlet flues 2 and the updraft outlet flues 3 are overbalanced by the heavier columns of air in the drying chamber and outside of the kiln, so that the operation of the heating coils sets up a flow of air in the direction indicated by the arrows, and as long as the temperature in the drying chamber is below that which corresponds to the temperature of the cooling medium for which the expansion outlet valve 27 is set said valve will remain closed, but as soon as the contents of the cooling coils are heated above such temperature the expansion valve 27 will open and allow the cooling medium to circulate in the cooling coils, and thereby cause the air to enter the drying chamber at a lower temperature. In this way an excessively high temperature is prevented in the drying chamber. The thermostat 31 controls the heating coils by holding the valve 29 open, until the temperature in the drying chamber reaches the maximum for which the thermostat is set, whereupon the valve 29 is closed to cut off the supply of heating medium. As soon as the temperature falls a certain extent, the valve 29 opens automatically and in this way the temperature in the drying chamber is kept constant or within the predetermined limits.

The metal wall 20, which separates the inlet flues 2 from the outlet flues 3, allows a certain amount of heat from the inlet flues to be transmitted to the outlet flues, raising the temperature of the outgoing air and thereby tending to increase the rate of air flow through the drying chamber. As the velocity of the air increases, an increased amount of fresh air is drawn into the inlets 14, which also has a regulating effect in maintaining an approximately constant temperature in the drying chamber.

After the volatile ingredients of the varnish, or other substance which is being dried, have been carried off, the outlet flues may be closed by swinging down the dampers 23 and turning the dampers 49 across the upper ends of the outlet flues, and the closures 15 and 18 may be disconnected from the cables 36 and closed. Then the device may operate with increased power efficiency by causing the air to follow an endless path flowing upwardly through the updraft flues 2, downwardly through the drying chamber, back to the updraft flues and so on. It is found in the practical operation of devices of this kind that varnishes which do not contain a large amount of volatile ingredients, and those from which the volatile ingredients have been removed, as hereinbefore described, may be rapidly dried by the recirculation of a single charge of air, since such charge of air contains ample oxygen for the purpose.

When the closures 15 and 18 are closed, the expansion valve 27 and the thermostat 31, with its associated mechanism, control the operation of the kiln and maintain a continuous circulation of air in the closed circuit, which has been described, by reason of the fact that the cooling coils maintain the temperature in the drying chamber below that which is maintained by the heating coils in the updraft flues 2.

The operation of the modified construction shown in Fig. 4, is similar in all respects to that of the form which has been described, with the exception that the air in flowing through the drying room takes a diagonal course, as indicated by the arrows, instead of an approximately vertical course. This is of advantage in cases where the articles which are being dried have large horizontal superficial areas, since this arrangement insures a better flow of air across such areas.

The foregoing is believed to clearly disclose the essential features of this invention, but it will be readily understood by those skilled in the art of drying that numerous details of the construction shown may be altered or omitted without departing from the spirit of this invention, as defined by the following claims.

I claim:

1. In a device of the class described, the combination of a drying chamber, an inlet flue communicating therewith at the top, an updraft outlet flue communicating with said drying chamber at the bottom, and means in one of said flues for heating the air in said inlet flue and for reheating the air in said outlet flue to increase the draft in said drying chamber.

2. In a device of the class described, the combination of a drying chamber, an inlet flue communicating therewith at the top, an updraft outlet flue communicating with said drying chamber at the bottom, and means for heating the air in said inlet flue and for heating the air in said outlet flue near the bottom thereof to increase the draft in said drying chamber.

3. In a device of the class described, the combination of a drying chamber, an updraft inlet flue communicating therewith at the top, means for heating the air in said inlet flue, and an updraft outlet flue communicating with said drying chamber at the bottom, said inlet and outlet flues having a common wall of metal adapted to heat the air in said outlet flue and thereby increase the rate of air movement.

4. In a device of the class described, the combination of a drying chamber, an updraft inlet flue communicating therewith at the top, means for heating the air in said inlet flue, and an updraft outlet flue communicating with said drying chamber at the bottom, said inlet and outlet flues being co-extensive with each other lengthwise of the drying chamber and having a common wall of metal adapted to heat the air in said outlet flue and thereby increase the rate of air movement.

5. In a device of the class described, the combination of a drying chamber, updraft inlet flues at opposite sides thereof, a distributing chamber above said drying chamber and communicating with the upper ends of said updraft inlet flues and also communicating with the upper part of said drying chamber, heating means in said updraft inlet flues, and updraft outlet flues located at opposite sides of said drying chamber and communicating therewith at its lower part.

6. In a device of the class described, the combination of a drying chamber, updraft inlet flues at opposite sides thereof, a distributing chamber above said drying chamber and communicating with the upper ends of said updraft inlet flues and also communicating with the upper part of said drying chamber, heating means in said updraft inlet flues, means interposed between said distributing chamber and said drying chamber and adapted to cause the air entering said drying chamber to be distributed across the horizontal area of said chamber, and updraft outlet flues located at opposite sides of said drying chamber and communicating therewith at its lower part.

7. In a device of the class described, the combination of walls arranged to provide a drying chamber, an updraft outlet flue at one side thereof and communicating therewith at the bottom, an updraft inlet flue located between said drying chamber and said outlet flue and communicating with said drying chamber at the top, and means for heating the air in said updraft inlet flue, whereby the heat passing through the external wall of said inlet flue will be utilized to increase the temperature of the air in said outlet flue and thereby increase the draft.

8. In a device of the class described, the combination of walls arranged to provide a drying chamber, an updraft outlet flue at one side thereof and communicating therewith at the bottom, an updraft inlet flue located between said drying chamber and said outlet flue and communicating with said drying chamber at the top, said inlet and outlet flues being substantially co-extensive with each other lengthwise of the drying chamber, and means for heating the air in said updraft inlet flue, whereby the heat passing through the external wall of said inlet flue will be utilized to increase the temperature of the air in said outlet flue and thereby increase the draft.

9. In a device of the class described, the combination of walls arranged to provide a drying chamber, an updraft outlet flue at one side thereof and communicating therewith at the bottom, an updraft inlet flue located between said drying chamber and said outlet flue and communicating with said drying chamber at the top, said inlet and outlet flues being substantially co-extensive with each other and with said drying chamber lengthwise of the drying chamber, and means for heating the air in said updraft inlet flue, whereby the heat passing through the external wall of said inlet flue will be utilized to increase the temperature of the air in said outlet flue and thereby increase the draft.

10. In a device of the class described, the combination of walls arranged to provide a drying chamber, an updraft outlet flue at one side thereof and communicating therewith at the bottom, an updraft inlet flue located between said drying chamber and said outlet flue and communicating with said drying chamber at the top, and means for heating the air in said updraft inlet flue, whereby the heat passing through the external wall of said inlet flue will be utilized to increase the temperature of the air in said outlet flue and thereby increase the draft, said inlet flue having air inlets for admitting air at opposite ends of the lower part thereof.

11. In a device of the class described, the combination of a drying chamber, an updraft inlet flue communicating therewith at the top, an updraft outlet flue, both said inlet and outlet flues being adapted to communicate with said drying chamber at the lower part, and means controlling the communication between the lower part of said drying chamber and said inlet and outlet flues, whereby the air leaving said drying chamber may be directed at will either into said inlet flue or said outlet flue.

12. In a device of the class described, the combination of a drying chamber, an updraft inlet flue communicating therewith at the top, an updraft outlet flue, both said inlet an doutlet flues being adapted to communicate with said drying chamber at the lower part, said inlet and outlet flues having a common connection with said drying chamber, and a gate movable between different positions whereby one of said flues may be opened to communication with the lower part of said drying chamber while the other is cut off from such communication and vice-versa.

13. In a device of the class described, the combination of a drying chamber, an updraft inlet flue communicating therewith at the top and having a fresh air inlet at the bottom, means for heating the air admitted to said drying chamber, an outlet flue for discharging air from said drying chamber, and thermostat controlled mechanism arranged to be sensitive to the temperature in said drying chamber and adapted to vary the free area of said air inlet through variation of the temperature in said drying chamber.

14. In a device of the class described, the combination of a drying chamber, an inlet flue communicating with said drying chamber at the top thereof, an outlet flue communicating with said drying chamber at the bottom thereof, and means for maintaining the air in both of said flues at a higher temperature than the air in said drying chamber throughout the height of the latter.

Signed at Chicago this 10th day of October 1912.

CHARLES HULTGREN.

Witnesses:
EUGENE A. RUMMLER,
EDWIN PHELPS.

It is hereby certified that in Letters Patent No. 1,110,788, granted September 15, 1914, upon the application of Charles Hultgren, of Chicago, Illinois, for an improvement in "Drying-Rooms," errors appear in the printed specification requiring correction as follows: Page 1, line 47, for the word "their" read *the air;* same page, line 75, for the word "lever" read *level;* page 4, line 45, after the word "means" insert the words *in one of said flues;* and same page, line 47, for the word "heating" read *reheating;* and that the said Letters Patent should be read with these corrections therein that the same may conform to the record of the case in the Patent Office.

Signed and sealed this 17th day of November, A. D., 1914.

[SEAL.]

R. F. WHITEHEAD,
*Acting Commissioner of Patents.*